Nov. 15, 1932.  K. BAUMANN ET AL  1,887,536
FLUID PRESSURE GOVERNING MECHANISM
Filed July 18, 1930  2 Sheets-Sheet 1

INVENTORS
KARL BAUMANN AND
J. E. JOLLEY.
BY
A. B. Reavis
ATTORNEY

Patented Nov. 15, 1932

1,887,536

UNITED STATES PATENT OFFICE

KARL BAUMANN, OF BARNFIELD, URMSTON, AND JOHN ERNEST JOLLEY, OF STRETFORD, MANCHESTER, ENGLAND, ASSIGNORS TO WESTINGHOUSE ELECTRIC AND MANUFACTURING COMPANY, A CORPORATION OF PENNSYLVANIA

FLUID PRESSURE GOVERNING MECHANISM

Application filed July 18, 1930, Serial No. 468,916, and in Great Britain August 26, 1929.

The invention relates to means for governing steam turbines or other engines wherein it is required to operate a regulating valve or the like (hereinafter referred to as the "governor valve") in accordance with variations in speed. The invention concerns particularly governing means of the kind in which a centrifugal or equivalent type of governor which is responsive to variations in speed, is arranged to control the operation of a fluid pressure system by which the operation of one or more governor valves is effected.

The object of my invention is to provide improved governing means of the kind referred to, which will be reliable and effective in operation and particularly advantageous for use in cases where the governor valves are so disposed with respect to the governor as to render direct connection therebetween inconvenient, or wherein it is desired to operate a plurality of governor valves simultaneously or in a desired sequence.

Accordingly the invention provides improved governing means of the kind referred to wherein the governor is adapted to operate a pilot valve which controls the application of fluid to a piston member of a fluid pressure relay which is operatively associated with the pilot valve so as to reset same when the pressure upon said piston member attains a value proportional to the displacement of the pilot valve from a given position, while the governor valve is also adapted to be operated by an operating piston, the application of pressure to which is controlled by a relay device responsive to and in accordance with the pressure upon the piston member aforesaid.

The improved governing means may conveniently be considered as comprising two fluid pressure relay devices, one, which may be termed the "translator unit", being associated with the governor pilot valve and adapted to control the pressure in a fluid system in accordance with the speed of the turbine or other engine in question while the other relay device, which may be termed the "sympathetic unit", controls the operation of the governor valve in accordance with the pressure in said fluid system, thereby establishing a definite relationship between the speed and the position of the governor valve. Any desired number of governor valves may be controlled by a corresponding number of sympathetic units all associated with the same fluid system. Furthermore, the operation of a number of governor valves may be caused to take place simultaneously or in a desired sequence by suitably shaping the ports of the relay devices.

The invention is illustrated diagrammatically by way of example in the accompanying drawings in which.

Figure 1:
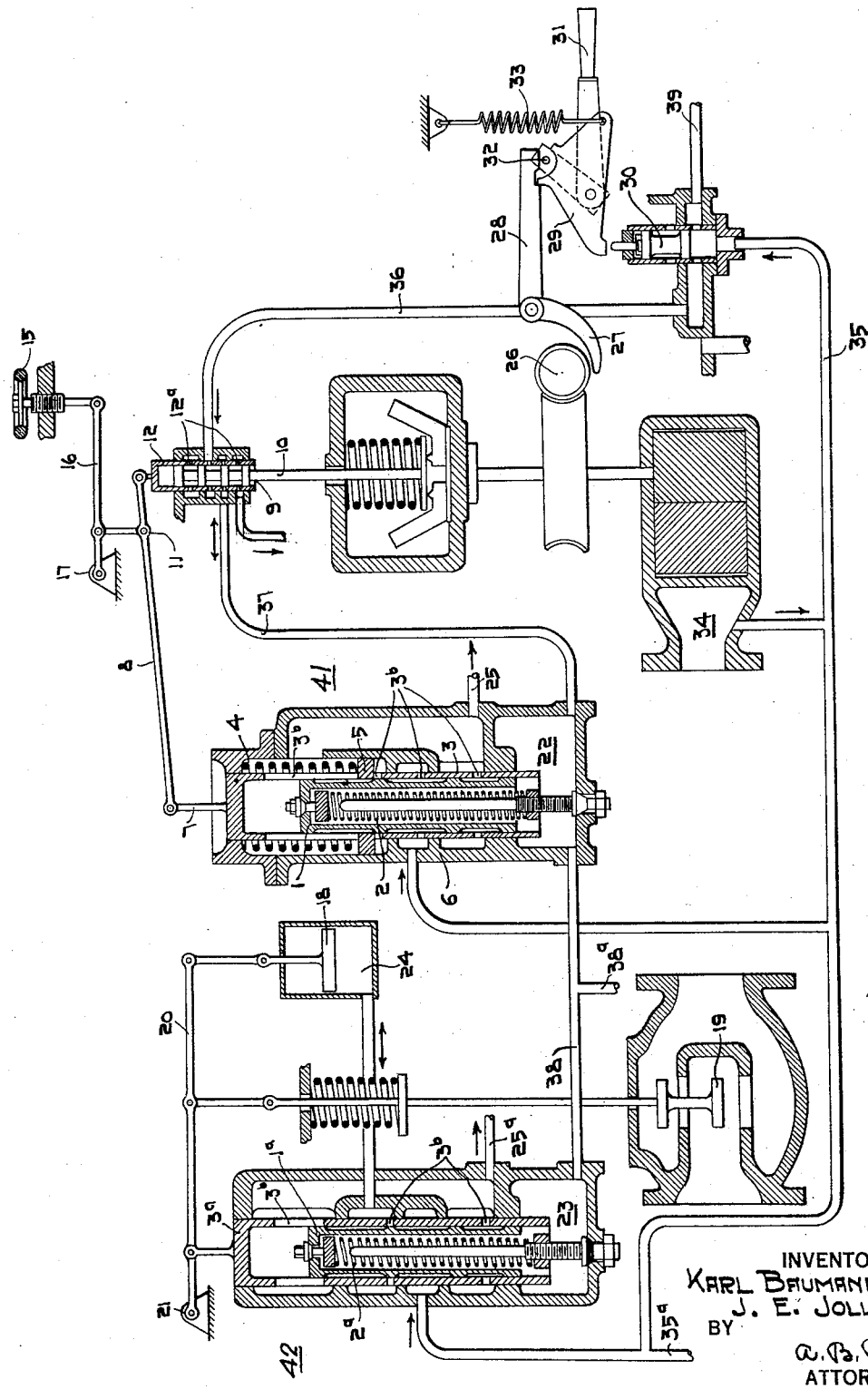
Fig. 1 shows a general arrangement of relay devices constituting translator and sympathetic units, together with auxiliary elements in one construction of the invention.

Referring to the drawings, the relay device constituting the translator unit 41, as shown in Fig. 1, comprises a piston member 1, hereinafter referred to as the "variable pressure piston" which is spring loaded by the spring 2 and is formed as a piston valve slidable within a sleeve 3 provided with ports 3b. The latter is loaded by a spring 4 and provided with a piston portion 5 to which pressure may be applied as hereinafter described in order to move said sleeve in opposition to its spring 4. The sleeve 3 is slidable in the relay casing 6 and at one end is connected with a rod 7 passing to the exterior of the casing and connected to a compensating lever 8 of a pilot valve 9.

Figure 2:
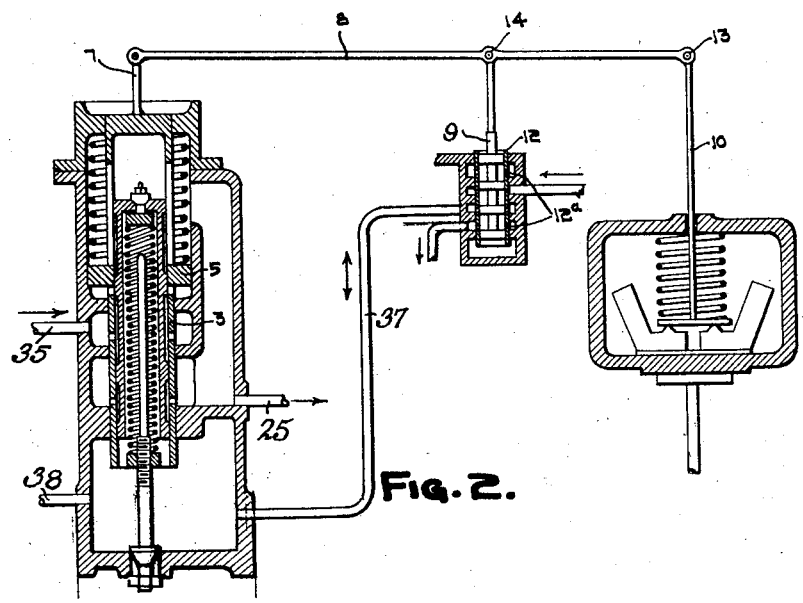
Fig. 2 shows a modified form of the translator unit and Fig. 3 shows a modified form of the sympathetic unit.

The pilot valve 9, which cooperates with a sleeve 12 having ports 12a, may be of usual type, connected as shown in Fig. 2, to the compensating lever 8 at an intermediate point 14 thereof, the ends of the lever being pivoted to the relay sleeve 3, 5 as above stated and at 13 to the governor spindle 10 respectively; or the pilot valve may be directly connected to the governor spindle 10 as shown in Fig. 1, in which case the compensating lever 8 is pivoted about a fixed pivot 11 and operates upon a slidable sleeve 12 provided with ports 12a and cooperating with the pilot valve. The advantage afforded in the construction shown in Fig. 1 is the facility of adjustment by adjusting the position of the fixed pivot 11, which is accomplished by a lever 16 pivoted to a fulcrum 17 and operated by a hand wheel 15.

The relay device constituting the sympathetic unit 42 may be substantially similar to that of the translator unit 41, with the exception that the ported sleeve member 3a is not formed with a piston portion. It is, however, connected with a power piston 18 for operating the governor valve 19 through the intermediary of a lever 20, which also serves as a compensating lever for the relay and is pivotally connected with the power piston 18, the governor valve 19, the sleeve member of the relay 3, and a fixed pivot 21.

The casings of the pilot valve and the relays are divided into pressure and drainage portions and connected with pipe lines as shown, appropriate for the operation of the system in the following manner:—

Upon a decrease in speed, the governor spindle 10 falls and moves the pilot valve 9 which admits fluid from a high pressure source such as a pump 34 to a compartment 22 of the translator relay casing by way of a pipe 35, a valve 30, and pipes 36 and 37. This compartment is in direct communication with a similar compartment 23 of the sympathetic relay casing by means of a pipe 38. The fluid pressure thus created in said compartments acts upon the variable pressure pistons 1 and 1a of both relays so as to move same in opposition to their springs 2 and 2a and thereby uncover the ports 3b of their associated sleeve members 3 and 3a. This causes, in the case of the translator unit 41, the piston portion 5 of the sleeve member 3 to be exposed to fluid from the high pressure source, whereby the sleeve is moved until its ports 3b are again covered by the variable pressure piston 1; at the same time the sleeve 12 of the pilot valve 9 is moved by the compensating lever 8 so as to tend to reset the pilot valve, i. e. to bring the pilot valve sleeve 12 into a position in which the pilot valve is again closed. The amount of movement of the pilot valve sleeve necessary for resetting depends upon the distance which the valve has moved, which in turn depends upon the change of speed of the governor. Hence the supply of pressure fluid to the variable pressure piston 1 of the translator unit 41 will not be cut off by closure of the pilot valve 9 until both said piston 1 and the sleeve member 3 associated therewith have moved a distance corresponding to the position of the pilot valve, that is corresponding to the governor speed. The fluid pressure acting upon the variable pressure piston 1 and opposed by the pressure of the spring 2 thereon will thus be brought to and maintained to a value corresponding to the governor speed.

The fluid pressure thus determined is also transmitted to the piston 1a of the sympathetic relay 42, so that the movement of this piston is also proportional to the governor speed. Moreover, movement of this piston 1a serves to establish communication between the high pressure source and a power cylinder 24 of the governor valve 19 so that the latter is moved in the opening direction until its movement, transmitted by the compensating lever 20 to the sleeve member 3a of the sympathetic relay 42, resets the latter and prevents the supply of further pressure fluid to the power cylinder 24. In this way the movement of the governor valve 19 is made proportional to the governor speed.

Should the governor speed increase, the governing arrangement acts in the reverse manner, permitting the pressure fluid to escape via the drains 25 and 25a until the opening of the governor valve 19 is again adjusted to the speed.

Figure 3:
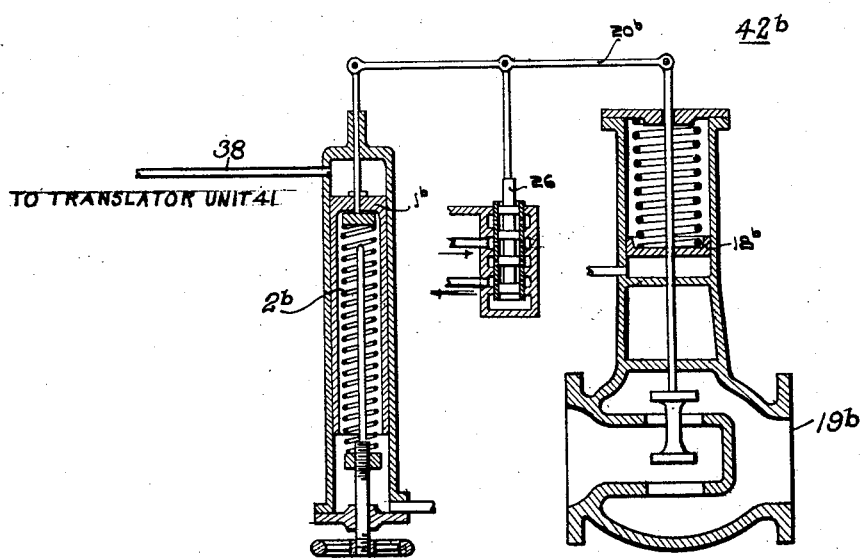

The construction of the relays may be varied without altering the principle of action thereof. In Fig. 3, for example, there is shown a sympathetic relay 42b of modified construction. In this case, the pressure responsive piston 1b controls a separate pilot valve 26, instead of being itself formed as a pilot valve as in the case of a piston member 1a in Fig. 1. The pilot valve 26 controls the application of fluid pressure to a power piston 18b which actuates the governor valve 19b, and it is connected to the piston 1b and the piston 18b by means of a compensating lever 20b. The piston 1b is biased upwardly by a spring 2b.

The operation of the sympathetic relay 42b shown in Fig. 3 is as follows: Upon an increase in pressure conveyed from the translator unit through the conduit 38, the piston 1b is depressed against the force of the spring 2b and lowers the pilot valve 26. The latter admits fluid pressure to raise the piston 18b, moving the valve 19b in opening direction. As the piston 18b moves upwardly, it raises the pilot valve 26 through the lever 20b until it is restored to cut-off position. Upon decrease in pressure, conveyed through the conduit 38, the spring 2b raises the piston 1b, the latter raising the pilot valve 26 through the lever 20b. The pilot valve 26 causes a downward movement of the piston 18b, and closing movement of the governor valve 19b. The pilot valve 26 is returned to cut-off position by the downward movement of the piston 18b through the lever 20b.

The free end 35a of the pipe 35 may lead to a similar governor valve gear and sympathetic unit on No. 2 steam chest, the pipe 38a being also connected thereto. The pipe 39 leads from the valve 30 to emergency valve mechanisms of which there may be one for each steam chest. The emergency valves function if the turbine speed rises above a predetermined limit, when the overspeed governor 26 strikes a trigger 27 which releases a catch 28, thus allowing a hammer 29 loaded by a spring 33 to hit the stem of the valve 30 and open the valve to drain. The resulting reduction of oil pressure causes the emergency valves to be shut.

A manual device is fitted which may be used both for tripping and resetting the emergency valve operating gear. The hand lever 31, on being lifted releases the catch 28 by means of the pin 32 and allows the hammer 29 to open the valve 30. To reset the gear, the hand lever 31 is moved downwards when the pin 32 pulls the hammer 29 upwards and allows the valve 30 to resume its normal position. It will thus be seen that when set the hand lever 31 is only operative to trip the device and after tripping it is only operative to reset the device.

It will be evident that a governing arrangement such as described above posseses a number of highly advantageous qualities. No mechanical connection between the governor and the valve which it regulates is required, so that these appliances may be disposed in any position that may be desirable and their operation will not be interfered with by external influences. Also the movement of the governor valve in response to a change of speed may be made very promptly since the parts are mostly of light construction, and in particular the variable pressure pistons which determine the operation of the remainder of mechanism may be entirely free to move against the action of their springs and need not be called upon to move any other member. The system also is not affected by variations in the forces necessary to operate the governor valve.

It will further be observed that the piston member which operates the sleeve of the translator relay may be of relatively small dimensions and require only a small amount of fluid to effect its operation, whereas the power piston of the governor valve which also resets the sleeve member of the sympathetic relay requires a greater force or a larger quantity of fluid for its operation. The resetting of the two sleeve members may, however, be arranged to take place in synchronism by suitably proportioning the ports which control the flow of fluid acting upon said pistons. Hunting in the governor system may thus be prevented.

The attainment of the degree of synchronism necessary for satisfactory governing is facilitated by the adoption of negative lap on the various relay valves, the effect of which is to establish unidirectional flow of fluid through the component parts of the gear, thus avoiding oscillations which might be set up by fluid alternating in direction.

Chokes may be fitted in the inlets or drains to the relays or pistons for the purpose of damping out undesired vibrations.

While we have shown our invention in two forms, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

What we claim is:—

1. A governing mechanism for the admission valve or valves of a prime mover comprising the combination of means providing an enclosed space for a regulating fluid pressure, a pilot valve for controlling said pressure, speed-responsive means for actuating the pilot valve, a fluid pressure relay for resetting the pilot valve when the regulating fluid pressure acquires the value called for by the speed-responsive means comprising an operating piston connected to the pilot valve, a pilot valve for the operating piston and means responsive to the regulating fluid pressure for controlling the last-mentioned pilot valve, and means responsive to said regulating fluid pressure for controlling the admission valve or valves.

2. A governing mechanism according to claim 1 in which the pilot valves include sleeves formed with ports having negative laps for the purpose of avoiding oscillations in the regulating fluid pressure.

In testimony whereof, we have hereunto subscribed our names this 1st day of July, 1930.

KARL BAUMANN.
JOHN ERNEST JOLLEY.